(12) United States Patent
Wodnicki et al.

(10) Patent No.: US 7,898,905 B2
(45) Date of Patent: Mar. 1, 2011

(54) RECONFIGURABLE ARRAY WITH LOCALLY DETERMINED SWITCH CONFIGURATION

(75) Inventors: Robert Gideon Wodnicki, Niskayuna, NY (US); Scott Daniel Cogan, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 388 days.

(21) Appl. No.: 12/180,873

(22) Filed: Jul. 28, 2008

(65) Prior Publication Data

US 2010/0020645 A1 Jan. 28, 2010

(51) Int. Cl.
*H04R 17/00* (2006.01)
(52) U.S. Cl. ....................................................... 367/138
(58) Field of Classification Search .................. 367/105, 367/138, 903, 122; 600/447
See application file for complete search history.

(56) References Cited

U.S. PATENT DOCUMENTS

| | | | |
|---|---|---|---|
| 4,537,074 A | 8/1985 | Dietz | |
| 4,550,606 A | 11/1985 | Drost | |
| 5,121,361 A | 6/1992 | Harrison, Jr. et al. | |
| 6,865,140 B2 | 3/2005 | Thomenius et al. | |
| 7,361,145 B2 | 4/2008 | Xi et al. | |
| 2005/0243812 A1 | 11/2005 | Phelps | |
| 2007/0016026 A1 | 1/2007 | Thomenius et al. | |
| 2009/0182233 A1* | 7/2009 | Wodnicki | 600/443 |
| 2010/0020645 A1* | 1/2010 | Wodnicki et al. | 367/155 |

\* cited by examiner

*Primary Examiner*—Dan Pihulic
(74) *Attorney, Agent, or Firm*—Jason K. Klindtworth (57) ABSTRACT

A method for dynamically reconfiguring elements in an ultrasound transducer array is provided. The method includes defining two or more groups of the elements in the array, wherein each element individually comprises a first switch, and a second switch; providing boundary definitions information to the elements in the array to define boundaries for the two or more groups; and locally determining switch configuration state within the array for the first and second switch of one or more elements based on the boundary definitions. Further, a switch matrix configured to locally determine switch settings is provided. Furthermore, a system comprising an array of ultrasonic transducer subelements is provided.

24 Claims, 4 Drawing Sheets

RECONFIGURABLE ARRAY WITH LOCALLY DETERMINED SWITCH CONFIGURATION

STATEMENT OF FEDERALLY FUNDED RESEARCH

This invention was made with Government support under grant number 5R01-CA115267-02 awarded by the National Institutes of Health. The Government has certain rights in the invention.

BACKGROUND

Embodiments of the invention relate to reconfigurable arrays, and more particularly to methods and systems for locally determining the configuration of the reconfigurable arrays.

Conventional ultrasound imaging systems comprise an array of ultrasonic transducers that are used to transmit an ultrasound beam and then receive the reflected beam from the object being studied. Ultrasound scanning comprises a series of measurements in which the focused ultrasonic wave is transmitted, the system switches to receive mode after a short time interval, and the reflected ultrasonic wave is received, beam-formed and processed for display. Typically, transmission and reception are focused in the same direction during each measurement to acquire data from a series of points along an acoustic beam or scan line. The receiver is continuously refocused along the scan line as the reflected ultrasonic waves are received.

For ultrasound imaging, the array typically has a multiplicity of transducers arranged in one or more rows and driven with separate signals in transmit. By selecting the time delay (or phase) and amplitude of the applied signals, the individual transducers in a given row can be controlled to produce ultrasonic waves that combine to form a net ultrasonic wave that travels along a preferred vector direction and is focused in a selected zone along the beam.

The same principles apply when the transducer probe is employed to receive the reflected sound in a receive mode. The voltages produced at the receiving transducers are summed so that the net signal is indicative of the ultrasound energy reflected from a single focal zone in the object. As with the transmission mode, this focused reception of the ultrasonic energy is achieved by imparting separate time delay (and/or phase shifts) and gains to the signal from each receiving transducer. The time delays are adjusted with increasing depth of the returned signal to provide dynamic focusing on receive.

The quality or resolution of the image formed is partly a function of the number of transducers that respectively constitute the transmit and receive apertures of the transducer array. Accordingly, to achieve high image quality, a large number of transducers are desirable for both two-and three-dimensional imaging applications. The ultrasound transducers are typically located in a transducer probe that is connected by a flexible cable to an electronics unit that processes the transducer signals and generates ultrasound images. The transducer probe may carry both ultrasound transmit circuitry and ultrasound receive circuitry.

In a typical ultrasound system, beam-forming is done using a large number of processing channels where each transducer element is linked to a single processing channel. In a reconfigurable array ultrasound transducer, multiple transducers are linked together and processed by a single ultrasound system channel simultaneously. This feature reduces the number of system channels that are required and thereby reduces the power, size and cost of the system.

A reconfigurable ultrasound array is one that allows groups of subelements to be connected together dynamically so that the shape of the resulting element can be made to match the shape of the wave front to improve performance and/or reduce channel count. The reconfigurable array consists of a large number of transducers that are linked together using semiconductor switches. Reconfigurability can be achieved using a switching network. Data to program the switch settings is typically calculated or stored in a controller system and then transferred over a digital data bus to the reconfigurable array. However, given the large number of transducers that need to be linked together using a large number of switches, there arises an information throughput bottleneck. This bottleneck places significant pressure on currently available technologies leading to difficult problems including data bit storage, data bus routing complexity, maximum required operating frequency, and power consumption.

BRIEF DESCRIPTION

In one embodiment, a method for dynamically reconfiguring elements in an ultrasound transducer array is provided. The method includes defining two or more groups of the elements in the array, where each element individually comprises a first switch, and a second switch. The method further comprises providing boundary definitions information to the elements in the array to define boundaries for the two or more groups, and locally determining switch configuration state within the array for the first and second switch of one or more elements based on the boundary definitions.

In another embodiment, a method for dynamically reconfiguring elements in an ultrasound transducer array is provided. The method includes forming group boundaries in the transducer array by providing different values to elements based on each respective elements location, and locally determining switch configuration data within the array based on the boundary definitions such that the switches within the same group boundaries are in operative association with one another.

In yet another embodiment, a switch matrix configured to locally determine switch settings is provided. The switch matrix provides storage of grouping information, and the switch matrix is adapted to locally determine switch settings automatically depending on group boundary information.

In another embodiment, a system comprising an array of ultrasonic transducer subelements is provided. Each of the transducer subelements comprises an ultrasonic transducer cell, a plurality of access lines coupled to one or more ultrasonic transducer cells, and a switching network comprising a first set of switches for electrically connecting selected ultrasonic transducer subelements to each other to define groups, and a second set of switches for electrically coupling the groups to selected access lines, the first and second sets of switches being locally configured.

DRAWINGS

These and other features, aspects, and advantages of the present invention will become better understood when the following detailed description is read with reference to the accompanying drawings in which like characters represent like parts throughout the drawings, wherein:

FIGS. 6-7 are drawings showing aperture projections formed based on the different parts of the scanning sequence that they relate to.

DETAILED DESCRIPTION

Embodiments of the present technique are directed to a reconfigurable ultrasound transducer array. In one embodiment, the reconfigurable array employs a switch matrix that locally determines switch settings. The locally determined switch settings are employed to configure the reconfigurable array for a series of changing aperture patterns based on boundary definitions. The boundary definitions enable formation of a predetermined element, such as a ring. In certain embodiments, the boundary definitions may be programmed into the switch matrix before each transmit/receive cycle.

Typically, the active aperture of an ultrasound transducer is divided into an array of smaller subelements. In certain embodiments, elements of different shapes are formed from these subelements by interconnecting the subelements using the electronic switches. The elements so formed can be "moved" electronically along the surface of the array to perform scanning by changing the switch configuration. Other element configurations permit beam-steering, which provides the ability to acquire volumetric data sets. A configuration of multiple concentric annular elements can provide optimal acoustic image quality by matching the element shapes to the acoustic phase fronts. One aspect of the present technique is the reconfigurability of the resulting array. It is these capabilities to both reconfigure elements and to have elements match phase fronts that significantly reduce the number of elements (or channels) needed to achieve high-end system image quality. With fewer channels the number of signals that need to be processed by beam-forming electronics is also relatively reduced. Therefore, the volume and power consumption of system electronics for a reconfigurable array is compatible with highly portable ultrasound systems.

In certain embodiments, a mosaic array having a multiplicity of subelements is provided, where each of the subelements include a respective multiplicity of micromachined ultrasound transducer (MUT) cells. Further, each MUT cell may include a top electrode and a bottom electrode. The top electrodes of the MUT cells making up any particular subelement are typically hard-wired together, while the bottom electrodes of those same MUT cells are also typically hard-wired together.

As used herein, the terms "locally determined" or "locally calculated" or "locally configured" embodies insitu determination of switch settings within the switch matrix. In other words, the switch settings determined at a location are not passed to the switch matrix; rather, a local determination of the switch settings is employed to configure the array. As will be appreciated, calculating the switch settings at a location outside the switch matrix requires higher bandwidth input/output (I/O) in the system in order to transfer the calculated data. For example, for calculating the switch settings in the probe handle of an ultrasound transducer, the system requires higher bandwidth I/O for transferring data from the control related application specific integrated circuit (ASIC), to the switch matrix ASIC. Whereas, local calculation of the switch settings does not require data transfer on such large scale in the system, thereby making the data transfer faster.

For the purpose of illustration, various embodiments of the invention will be described that utilize capacitive micromachined ultrasonic transducers (cMUTs). However, as will be appreciated, the aspects of the present technique disclosed herein are not limited to use of cMUTs, but rather may also employ piezoelectric micromachined ultrasonic transducers (pMUTs) or even diced piezoceramic arrays, where each of the diced subelements are connected by interconnect means to an underlying switching layer.

An array of such cMUT transducer cells is typically fabricated on a substrate, such as a heavily doped silicon (hence, semiconductive) wafer. For each cMUT transducer cell, a thin membrane or diaphragm, which may be made of silicon nitride, is suspended above the substrate. The cavity between the membrane and the substrate may be air-filled or gas-filled. Alternatively, the cavity between the membrane and the substrate may be wholly or partially evacuated. A film or layer of conductive material, such as aluminum alloy or any other suitable conductive material, forms an electrode on the membrane, and another film or layer made of conductive material forms an electrode (bottom electrode) on the opposite side of the substrate. Alternatively, the bottom electrode can be formed by appropriate doping of the semiconductor substrate.

The two electrodes separated by the cavity, form a capacitance. When an impinging acoustic signal causes the membrane to vibrate, the variation in the capacitance can be detected using associated electronics, thereby transducing the acoustic signal into an electrical signal. Conversely, an AC signal applied to one of the electrodes will modulate the charge on the electrode, which in turn causes a modulation in the capacitive force between the electrodes, the latter causing the diaphragm to move and thereby transmit an acoustic signal.

The individual cells may have round, rectangular, hexagonal, or other peripheral shapes, however, hexagonal shapes provide dense packing of the cMUT cells of a transducer subelement. The cMUT cells may have different dimensions so that the transducer subelement will have composite characteristics corresponding to the different cell sizes, giving the transducer a broadband characteristic.

In certain embodiments, a system includes an array of ultrasonic transducer subelements, where each of the transducer subelements includes an ultrasonic transducer cell. The system includes a plurality of access lines coupled to one or more ultrasonic transducer cells, and a switching network comprising a first set of switches (or matrix switches) for electrically connecting selected ultrasonic transducer subelements to each other. For example, the subelements may be connected to each other to define groups based on boundary definitions. The switch matrix may include a second set of switches (or access switches) for electrically coupling the groups of subelements to selected access lines or bus lines. In one embodiment, both the first and the second set of switches are locally configured. That is, the state of the first and second switches is locally determined within the switch matrix.

In one embodiment, each ultrasonic transducer subelement has a unit switch cell associated therewith. Each unit switch cell may comprise at least one access switch, at least one matrix switch, and control logic. The states of the switches are controlled by respective switch control circuits. In addition, a digital circuit may control the gate turn-off voltage and the gate turn-on voltage. This digital circuit has local memory of the state of the switch. In the case of high voltage switches, an internal control system, such as a programming circuit, programs all of the switch memories to be in either the ON, OFF or NO_CHANGE state. Subsequently, a global select line is used to apply the state to the actual switch control circuit. Therefore, until the global select line is actuated, the turn off and turn on voltages both may be zero. In this state, the switch itself retains its last state. When the global select line is actuated, the stored switch state is transferred to the switch itself. This may be done by transitioning the turn off voltage to a low state (e.g., turn off the switch), or transitioning the turn on voltage to a low state (e.g., turn on the switch), or transitioning both the turn off voltage and the turn on voltage low (e.g., no change to the switch state). When using low voltage switches in the switching matrix, the state of the switch is stored locally in a memory such as an SRAM or DRAM, for example, and takes immediate effect in turning the switch on or off. In one embodiment, the switch matrix is in operative association with a global select line to determine whether cells are programmed directly. In another embodiment, the cells determine their own mapping based on programmed data.

In certain embodiments, the switches may have memory for storing the current switch states. However, the switches may or may not store the values. In one embodiment, the switch matrix does not store the switch settings. In this embodiment, the switch settings are locally determined within the switch matrix.

In certain embodiments, a method for dynamically reconfiguring elements in an ultrasound transducer array includes forming group boundaries in the transducer array by providing different values to elements based on the location of each of the respective element in the transducer array. The group boundaries are determined based on boundary definitions. In one example, the boundary definitions may be based on voltages of the different elements such that the elements having voltage values within a given range fall under one group boundary. Further, the method includes locally determining switch configuration data within the array based on the boundary definitions such that the switches within the same group boundaries are in operative association with one another.

In certain embodiments, a method for dynamically reconfiguring elements in an ultrasound transducer array includes defining two or more groups of the elements in the array. In one example, the two or more groups are defined by assigning values to the elements from an external source, wherein the external source is located outside the array. In an alternate embodiment, the groups are defined by locally assigning values to the elements.

Subsequently, the boundary definitions are provided to the elements in the array to provide boundaries for the groups. The boundary definitions may be provided in several fashions. For example, the boundary definitions may be defined as iso-voltage lines by creating a voltage distribution across the array, and defining boundaries as iso-voltage lines across the array. For example, the iso-voltage lines may be identified using comparators. In one example, the boundary definitions are provided based on one or more of a beam forming delay, common phase delay, beam elevation, or depth of a target. In one embodiment, the boundary definitions are based on global parameters that are transmitted to one or more elements in the array, wherein the global parameters are predetermined, or the global parameters are determined during the operation.

Advantageously, each element in the array requires a single bit of data to define the state of switches. In certain embodiments, the state of each switch in each cell is defined explicitly with a single bit of data, which is transferred from an external controller and stored in local memory within each cell. With the present technique, switch settings may be stored implicitly by calculating them locally based on a smaller subset of information.

Based on the boundary definitions, the switch settings or switch configuration states may be locally determined within the switch matrix. In one example, the switch settings may be locally determined using analog or digital methods, or a combination of analog and digital methods. In one example, the matrix switch settings of one or more elements may be digitally computed by assigning values to the elements, wherein the assigned values are provided depending on the location of the elements with respect to the boundaries. In one embodiment, assigning the values comprises alternatively assigning binary values for the elements so as to define the boundaries. In this embodiment, a first binary value is assigned for the elements that are on one side of a boundary (such as a ring boundary) and a second binary value is assigned to the elements that are on a second side of the boundary.

In one embodiment, locally determining switch configuration data includes propagating a control signal through access lines to an access switch selected in a determined group. Subsequently, the control signal is transferred via matrix switch connections to one or more elements in the determined group. Once the control signal is transmitted to the one or more elements, the first switches are turned on in these elements of the determined group. Additionally, the first switches that are not connected to an access line having the control signal are turned off.

In one embodiment, the method comprises configuring the access switch of the elements by successively selecting groups. Subsequently, the method includes assigning the access switch of the one or more elements to be turned on where the access switch overlaps with a selected group. In these embodiments, grouping includes grouping the elements to form annular rings, elliptical shapes, squares, triangles, or other geometric shapes based upon, for example, the shape of the wave front.

In certain embodiments, the elements of the transducer array may be coupled to a single system channel. Further, the boundary definition information in the array may be altered to correspond with a shift in an aperture. Subsequently, the switch settings are locally determined to accommodate the shift in the aperture. The boundary information may also be shifted around in the array to translate the aperture whereupon the new matrix switch settings are automatically locally calculated for each new state of the shifting aperture.

Figure 1:
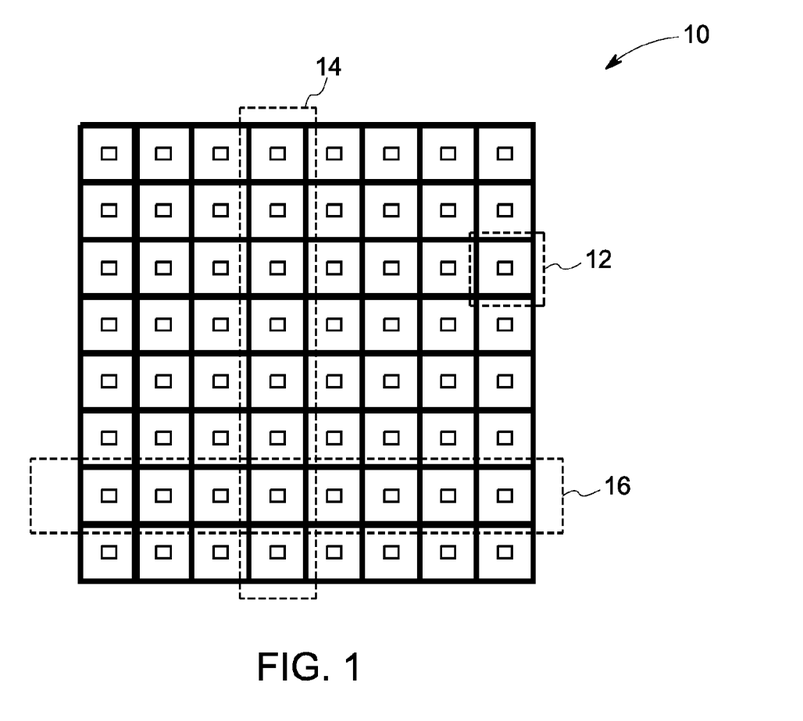
FIG. 1 is a drawing showing a reconfigurable array of unit cells, in accordance with embodiments of the present technique.
Figure 2:
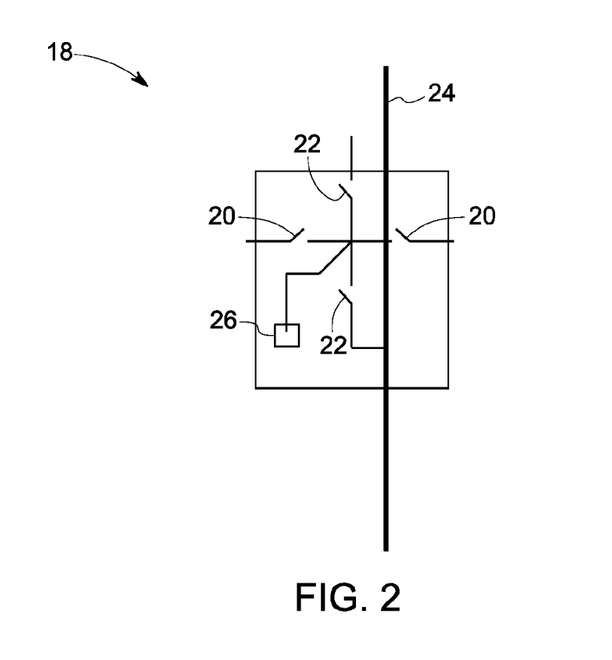
FIG. 2 is a schematic representation of a CMOS unit cell, in accordance with embodiments of the present technique.

FIG. 1 illustrates an exemplary reconfigurable array 10 of unit cells 12 defined by columns 14 and rows 16. Each transducer sub-element is accessed using a unit cell, such as a CMOS unit cell. FIG. 2 illustrates a schematic of an exemplary CMOS unit cell 18. The unit cell 18 has at least two first switches (matrix switches) 20, one or more second switches (access switches) 22, and one or more row mux switches (not shown) that are locally integrated within the cell 18. These switches 20 and 22 are reprogrammed for each transmit/receive cycle. Conventionally each switch requires a single bit of data to set its state. A typical ultrasound array may require as many as 40000 such cells and so the number bits to transfer can be large.

Returning to FIG. 2, the unit cell 18 further comprises an access line 24, and a transducer connection 26. The access switch 22 of a unit cell 18 electrically connects a sensor subelement to an access line 24 when the access switch 22 is turned on. On the other hand, the matrix switch 20 electrically connects the respective sensor subelements to a respective adjacent one of the sensor subelements when the matrix switch 20 is turned on.

Figure 3:
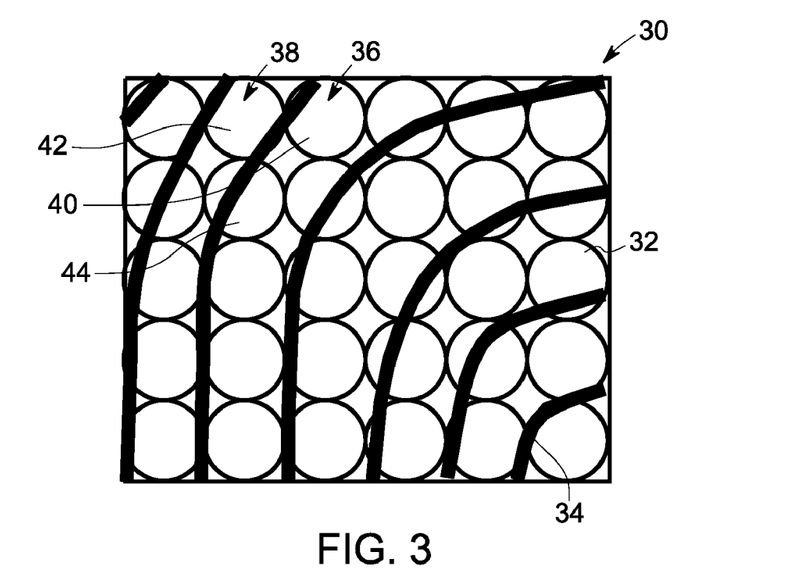
FIG. 3 is a drawing showing a reconfigurable array having a plurality of sub-elements, in accordance with embodiments of the present technique.

FIG. 3 illustrates an exemplary embodiment where each cell requires only one bit of data in total. In the illustrated embodiment, a reconfigurable array 30 includes a plurality of subelements 32, each of which has a corresponding CMOS cell, such as unit cell 18. The array 30 includes boundaries 34 of the groups 36 and 38. Although not illustrated, the groups 36 and 38 are portions of rings formed in the reconfigurable array 30. For example, the sub-element 40 is part of ring portion 36, while sub-element 42 is part of the ring portion 38. A sub-element, such as the sub-element 44, which falls on a boundary may be assigned to a group in which the major portion of the sub-element falls. Accordingly, although the sub-element 44 is physically located between rings 36 and 38, the sub-element 44 may be nominally assigned to ring 36 as part of an approximation of the ideal group boundaries.

In the illustrated embodiment, the sub-elements 40 and 42 are on different rings 36 and 38, respectively. Accordingly, the matrix switch 20 that connects the sub-elements 40 and 42 is turned off. Whereas, the sub-elements 40 and 44 are assigned to the same ring 36, the matrix switch between sub-elements 40 and 44 is turned on. In accordance with the present technique, it is not required to program the states of the switches connecting sub-elements 40 to 42 and 40 to 44 explicitly given the information that 40 and 44 are on the same ring while sub-elements 40 and 42 are on different rings. It is sufficient to program the information about the ring boundaries into the cells and let the cells determine on their own as to which switches should be turned on.

From these ring bits (or group bits), the actual switch settings may be directly calculated. In one example, the switch settings are calculated using an XNOR gate, where, for example, the switch between sub-elements 40 and 42 is found to be off since 1 XNOR 0 is 0, whereas the switch between subelements 40 and 44 is found to be on since 0 XNOR 0 is 1. Other computations may be performed given more complex criteria.

Figure 4:
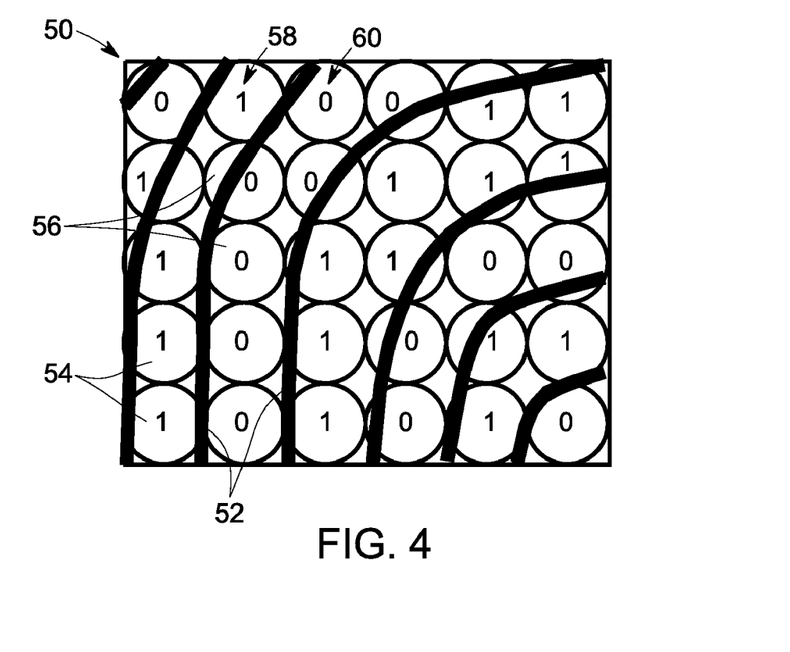
FIG. 4 is a drawing showing a method of defining the ring boundaries in a reconfigurable array.

FIG. 4 illustrates an example of a method to define the boundaries 52 in a reconfigurable array 50. In the illustrated embodiment, a series of '1' and '0' group data bits or ring data bits are programmed into the cells 54 and 56, respectively. The ring bits represent alternating assignments of the cells 54 and 56 to the rings, such that ring 58 is assigned to have cells programmed to have a first bit value (e.g., 1), whereas ring 60 is assigned to have cells programmed to have a second bit value (e.g., 0). In this way, group boundaries are clearly defined as being located between those cells whose neighbors have different assigned group bits from their own.

It should be appreciated that with this type of programming architecture, only a single data bit is required for the matrix switches in each cell. Whereas in previously available designs 1 data bit was required for each matrix switch. In the worst case of a design where 8 matrix switches are used, 8 data bits were required for each cell. The present technique therefore, results in a savings of 8:1 in the amount of data required. As will be appreciated, this kind of savings is significant because it is directly related to savings in terms of power, required programming throughput and cell logic area. Also, savings in terms of power, required programming throughput and cell logic area are desirable for a highly portable, highly integrated reconfigurable transducer array.

Figure 5:
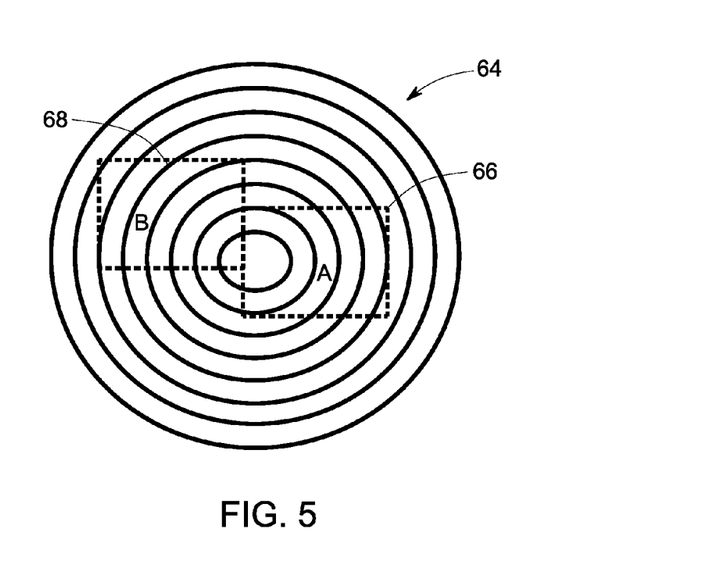
FIG. 5 is a drawing showing a method for deriving the ring topology based on a universal iso-delay line topography map.
Figure 6:
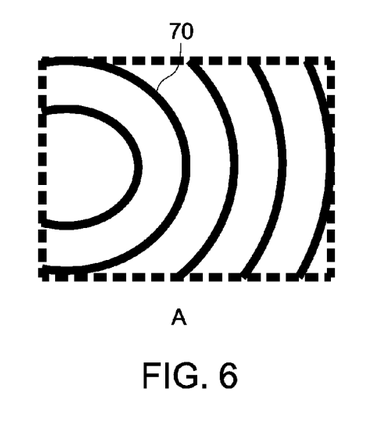
Figure 7:
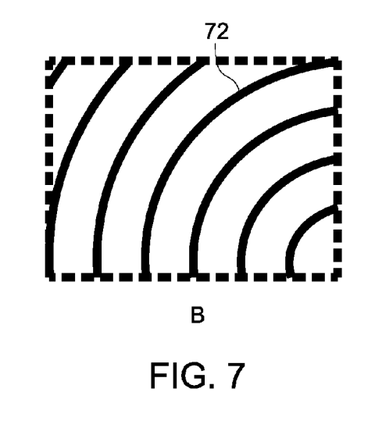

In another embodiment for assigning ring bits to cells, the location of the ring boundaries may be calculated using analog circuitry. Referring now to FIG. 5, a method for deriving the ring topology based on a universal iso-delay line topography map 64 is shown. For a given aperture configuration, the universal iso-delay line map may be computed. This map may then be used to further compute the individual apertures, such as apertures 66 and 68, that will be used during a scanning sequence by projecting the ring iso-delays lines onto an aperture window as shown. As illustrated in FIGS. 6 and 7, different aperture projections 70 and 72 are formed, respectively, based on the different parts of the scanning sequence that they relate to.

Upon knowing the aperture projections, the aperture projections data may be transferred into the array by creating an analogous voltage distribution in the cell matrix, and subsequently locating the ring boundaries as specific iso-voltage lines within the voltage distribution in the array. In one embodiment, the iso-voltage lines may be determined locally within the cells using comparators that are set relative to specific global voltage levels which are distributed throughout the array using, for example a resistor mesh. The comparators can be dynamically biased such that they are turned on only for a short period of time to compute the ring bits and then turned off immediately afterwards to save power. Accordingly, ring bits may be calculated locally in a very short period of time and potentially in a more power efficient manner than by programming the ring bits directly from an external memory. To change the configuration, the voltages on the boundaries of the aperture may be changed using digital to analog converters and the ring bits are recomputed in an analog fashion once the voltage profiles have adequately settled. In one embodiment, the digital to analog converters may be external to the device. In another embodiment, the digital to analog converters may be integrated locally on the array ASIC adjacent to the array.

In one embodiment, the array may have a global select line which allows the system to decide whether to program the switches explicitly or have the cells determine which switches to program. In one example, this feature could be used during testing of the array to check whether all switches are working correctly. It should be noted that once the matrix switch settings have been computed, it is necessary to compute the access switch and row mux switch settings. These can also be determined locally within the array itself using the following methods.

According to one exemplary method for programming access switches, first all matrix switches are configured as described above. Next, a digital token is propagated through the matrix switches from ring to ring in a series of operations such that each ring is selected in turn. When a ring is selected, all access switches in that ring are turned on. Next, only those access lines which are to be connected to the selected ring are chosen using circuitry external to the array. In selecting these lines, a high voltage (indicated by e.g., a '1' bit) is applied to their traces. This '1' bit is propagated along the access lines to the selected ring and enters only those cells which have natural connections to the selected access lines through their access switches which are turned on.

Once the '1' bit reaches the inside of the cells, it is stored as a high state for the access switches in the cells. All other access switches store a low state and so will not be turned on during subsequent operation. Next, a global control signal is toggled and all access switches turn off including those that have been programmed on. Finally, another global select line is toggled causing the ring token to propagate from the currently selected ring on to the next ring in the sequence. In another embodiment, a global control voltage may be used to select rings in succession instead of a propagating ring token bit.

Figure 8:
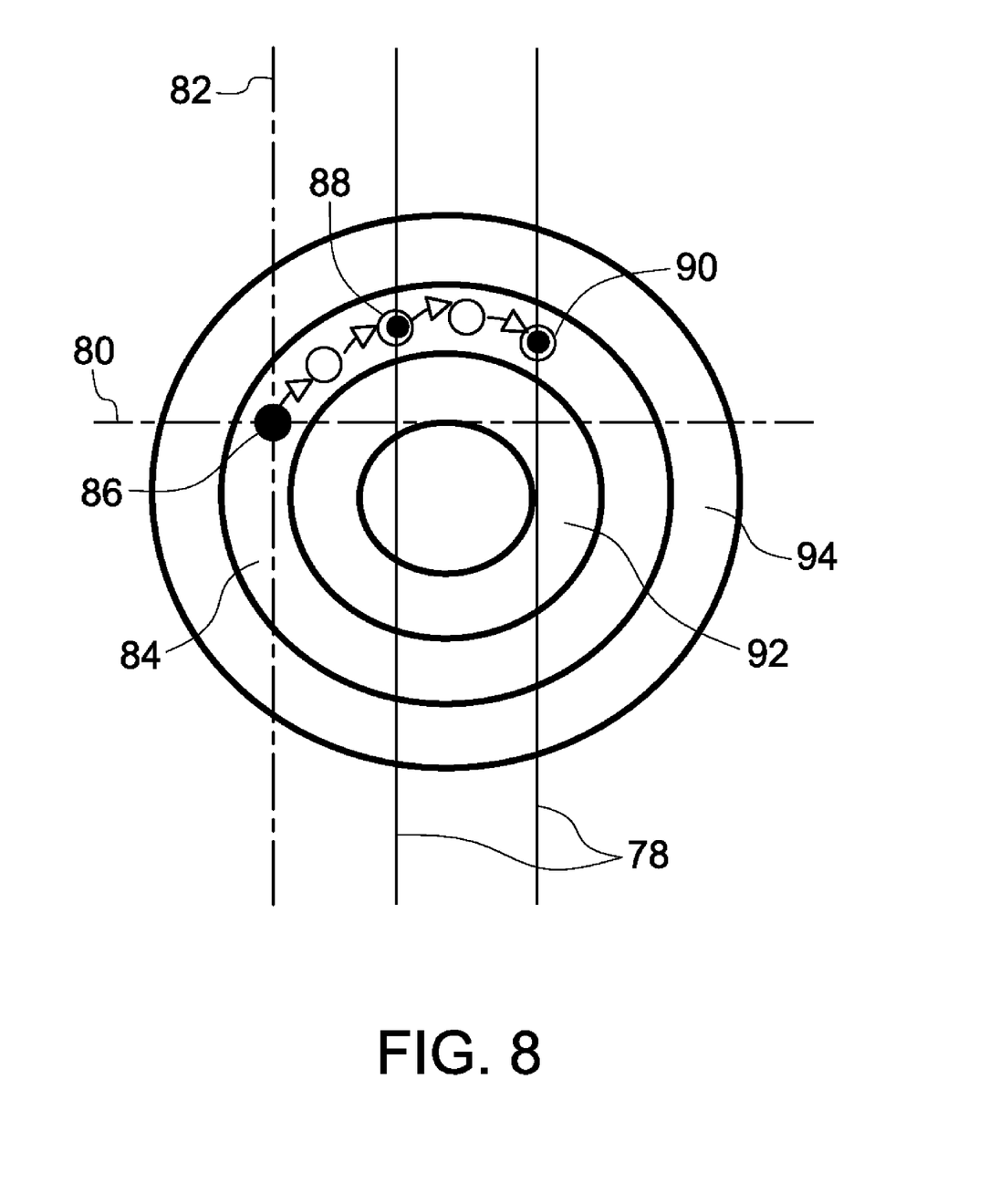
FIG. 8 is a schematic representation of a method of programming the access switches.

A second method of programming the access switches is illustrated in FIG. 8. In the illustrated embodiment, on-chip channel lines (not shown) and access lines 78 are controlled directly and used to select individual cells directly through an abscissa-ordinate addressing structure 80 and 82. Within each ring, such as ring 84, a single target cell 86 is selected and its respective access switch is turned on. Once the target cell 86 in each ring has been turned on, the individual rings can be selected successively by driving the access lines 78 that connect into the target cell 86.

In certain embodiments, the access switches of each ring are turned on in succession in the manner described below. First the access line 78 connected to the target cell 86 for that ring 84 is selected. This causes a high bit to be propagated from the target cell 86 along the selected ring 84 to all cells in that ring. Next, all of the access lines 78 which must be connected to ring 84 are also selected. The cells 88 and 90, which receive both the signal from the target cell 86 and also have selected access lines 78 connected to them are programmed to have their access switches turned on. These states are stored and then the selection circuitry moves on to process the next ring, such as ring 92 or 94 in the sequence of rings in the aperture.

In one embodiment, it is also possible to use an analog control voltage to select rings in turn in order to program the access switches, similar to the method that was described above for the matrix switches. Another method to program the access switches may be to apply a series of different voltage levels to each group of access lines. Within the cells, analog voltage comparators would compare the access line voltage to their global ring voltage and use the result of the comparison to decide whether or not the given access switch should be turned on. In one example, with the array having 32 rings and a maximum voltage of 5 Volts, the least significant bit will have a voltage level of 5/32=150 mVolts. As will be appreciated, 150 mVolts voltage level is large enough that very simple comparator circuitry might be used which would not require low noise input circuitry or offset correction to produce accurate results. Programming the access lines in this fashion would allow all switches to be programmed simultaneously since all of the various voltages could be applied at the same time.

In one embodiment, a method to set the state of the row mux switches once the access switches have been programmed is provided. The unit cell would be designed such that all access lines and channel lines can drive logic circuits in the cells that they cross over directly.

Using an on chip circular shift register, for example, each of the 64 access lines may be selected in turn by coupling a driver to it that forces a voltage equivalent to '1'. For each step of the circular shift register, a '1' voltage may be driven on the channel that is to be connected to the respective access line. For example, if a 5$^{th}$ access line is connected to a 3$^{rd}$ channel then, when the on-chip counter reaches the 5$^{th}$ access line, a high bit is driven on the 3$^{rd}$ channel line. The high bit will be propagated through to the cell that has the respective row mux switch in it and will be stored. The cells that have already been programmed to 'ON' will remember their state until a global reset is selected. Finally, these steps are repeated until all of the required row mux switches are turned on. As with the above method for programming the access switches and matrix switches, analog voltages could be used to select multiple channels simultaneously. This feature would increase the rate of programming at the expense of requiring local comparators in each cell and the distribution of a series of comparator reference voltages.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for dynamically reconfiguring elements in an ultrasound transducer array, comprising:
    defining two or more groups of the elements in the array, wherein each element individually comprises a first switch, and a second switch;
    providing boundary definitions information to the elements in the array to define boundaries for the two or more groups; and
    locally determining switch configuration state within the array for the first and second switch of one or more elements based on the boundary definitions.

2. The method of claim 1, wherein the two or more groups are defined by assigning values to the elements from an external source located outside the array.

3. The method of claim 1, wherein the boundary definitions are provided based on one or more of a beam forming delay, common phase delay, beam elevation, depth of a target, steering and aperture translation.

4. The method of claim 1, wherein locally determining the switch configuration comprises creating voltage distribution across the array, and defining boundaries as iso-voltage lines across the array.

5. The method of claim 4, wherein the iso-voltage lines are identified using comparators.

6. The method of claim 4, wherein the digital computing of the first switch of one or more elements comprises assigning values to the elements, wherein the assigned values are provided depending on the location of the elements with respect to the boundaries.

7. The method of claim 4, wherein assigning the values comprises alternatively assigning binary values for the elements to define the boundaries, wherein a first binary value is assigned for the elements that are on one side of the ring boundary and a second binary value is assigned to the elements that are on a second side of the boundary.

8. The method of claim 1, further comprising:
    configuring the second switch of one or more elements by successively selecting groups; and
    assigning the second switch of the one or more elements to be turned on where the second switch overlaps with a selected group.

9. The method of claim 1, wherein locally determining switch configuration state within the array for the first switch of the one or more elements, comprises:
    assigning ring bits information into two or more ultrasound transducer cells depending on the position of the cells with respect to the two or more groups; and
    employing an XNOR gate to determine switch settings of the first switch of the two or more cells.

10. The method of claim 9, wherein locally determining switch configuration state within the array for the second switch of the one or more elements comprises propagating a digital token through the first switch of the one or more elements through the two or more groups.

11. The method of claim 9, wherein locally determining switch configuration state within the array for the second switch of the one or more elements comprises:

selecting a target cell within each of the two or more groups; and turning on the first switch of the target cell; and successively selecting the two or more groups by driving access lines connecting the target cells in the two or more groups.

12. The method of claim 1, wherein defining the two or more groups of the elements comprises grouping the elements to form annular rings, elliptical shapes, squares, triangles, and other geometric shapes.

13. The method of claim 1, wherein the elements are coupled to a single system channel.

14. The method of claim 1, further comprising:

changing the boundary definition information in the array to correspond with a shift in an aperture; and locally computing switch settings for steering and translating the aperture.

15. The method of claim 1, wherein the boundary definitions are based on global parameters which are transmitted to one or more elements in the array.

16. The method of claim 15, wherein the global parameters are predetermined, or the global parameters are determined during the operation.

17. The method of claim 1, wherein each element in the array requires a single bit of data to define the state of switches.

18. The method of claim 1, wherein locally determining switch configuration data, comprises:

propagating a control signal through access lines to a single second switch selected in a determined group;

transferring the control signal via first switch connections throughout the elements in the determined group;

turning on the first switches in the determined group using the control signal; and turning off the first switches that are not connected to an access line having the control signal thereon.

19. A method for dynamically reconfiguring elements in an ultrasound transducer array, comprising:

forming group boundaries in the transducer array by providing different values to elements based on each respective elements location; and locally determining switch configuration data within the array based on the boundary definitions such that the switches within the same group boundaries are in operative association with one another.

20. A switch matrix configured to locally determine switch settings, wherein the switch matrix provides storage of group boundary information, and wherein the switch matrix is adapted to locally determine switch settings automatically depending on the group boundary information.

21. The switch matrix of claim 20, wherein the switch matrix does not store the switch settings.

22. The switch matrix of claim 20, in operative association with a global select line to determine whether cells are programmed directly or determine their mapping themselves based on programmed data.

23. The switch matrix of claim 20, wherein the switch matrix is employed in ultrasonic transducer elements.

24. A system comprising:

an array of ultrasonic transducer subelements, wherein each of the transducer subelements comprises an ultrasonic transducer cell;

a plurality of access lines coupled to one or more ultrasonic transducer cells; and a switching network comprising a first set of switches for electrically connecting selected ultrasonic transducer subelements to each other to define groups, and a second set of switches for electrically coupling the groups to selected access lines, the first and second sets of switches being locally configured.

* * * * *